2,314,712

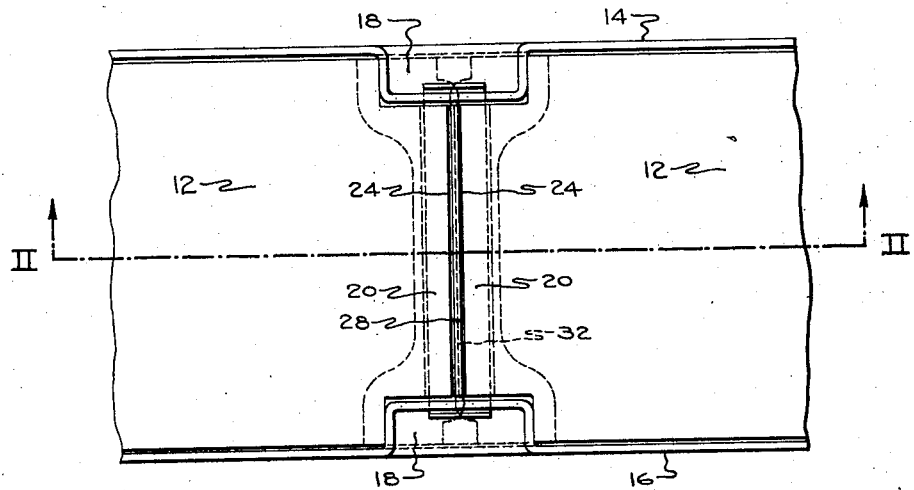
Fig. 1
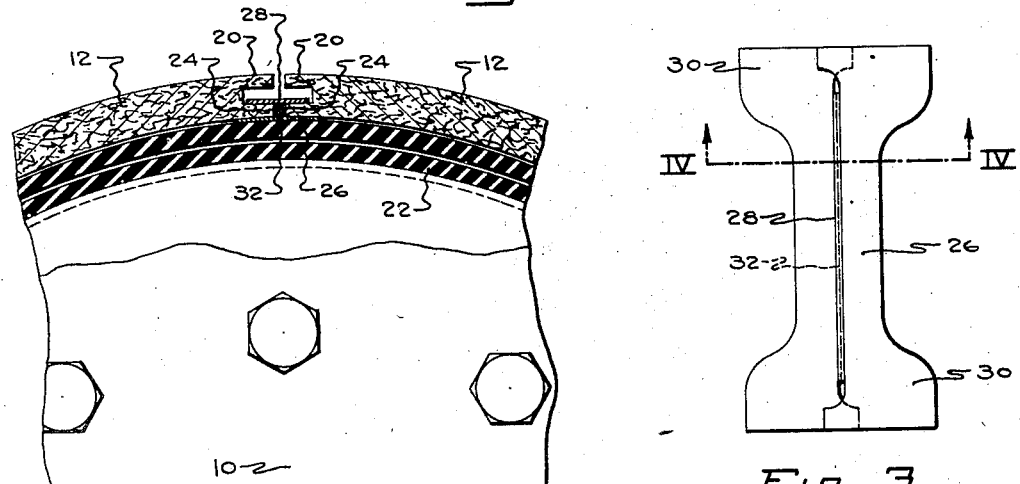
Fig. 2
Fig. 3
Fig. 4
James T. King, Inventor
By Beaman & Langford, Attorney Patented Mar. 23, 1943

UNITED STATES PATENT OFFICE 2,314,712

EXPANDER TUBE BRAKE

James T. King, Burbank, Calif., assignor to Hayes Industries, Inc., Jackson, Mich., a corporation of Michigan Application August 2, 1940, Serial No. 349,398

4 Claims. (Cl. 188—152)

The present invention relates to improvements in expander tube brakes having particular reference to a shim structure specifically designed to be used in connection with the expander tube brake construction shown in application Serial No. 275,355, filed May 24, 1939.

In practice, it has been found that the radially expanded brake blocks and their associated structure with which the expander tube directly engages have a detrimental effect upon the outer surface of the expander tube at certain places.

According to the present invention, a novel shim structure has been provided which underlaps the gap between adjacent radially expanded brake blocks. Thus, one of the objects of the present invention is to provide an improved shim structure for application between the expander tube and the radially actuated brake blocks of an expander tube brake.

Another object is to provide an improved expander tube brake assembly comprising radially actuated brake blocks and a shim structure imposed between the expander tube and the joint between adjacent brake blocks.

These and other objects and advantages residing in the combination, construction and arrangement of parts will more fully appear from the following description when considered in connection with the appended claims.

In the drawing,

Fig. 1 is a fragmentary plan view of an expander tube brake assembly embodying the present invention, Fig. 2 is a fragmentary side elevational view of an expander tube brake assembly showing the section taken on line II—II of Fig. 1, Fig. 3 is a plan view of one form of shim, and Fig. 4 is a cross-sectional view taken on line IV—IV of Fig. 3 of the shim.

Referring to the drawing, the reference character 10 designates an expander tube brake assembly of the construction shown in the above identified co-pending application.

The supporting structure for the individual brake blocks 12 comprises two sheet metal members 14 and 16 having the flange portions thereof indented at 18 to provide thrust shoulders for the brake blocks 12. At opposite ends of the blocks 12 are tongue portions 20 which are positioned between the shoulder portions 18. With the expander tube 22 deflated, there is a slight clearance between opposed ends 24 of the blocks 12. When the brakes are to be applied, the tube 22 is inflated and the blocks 12 are radially moved, increasing this clearance as should be readily understood. The shoulder portions 18 also present abutment surfaces limiting the expansion of the tube 22 beneath these portions. It will be understood that the tube 22 is of uniform width and fully extends between the sides of the members 14 and 16.

It has been found in practice that the clearances between adjacent ends of the blocks 12 and the undersides of the abutment surfaces, provided by the shoulders 18, result in detrimental markings and distortions of localized portions of the expander tube 22 when in direct contact therewith.

According to the present invention, the above difficulty has been completely overcome through the provision of an extremely thin sheet metal shim 26, which is preferably provided with a central rib portion 28 for holding the same in position by having the rib 28 received between the slightly spaced adjacent ends 24 of the blocks 12. It should also be noted that this shim is so constructed as to be positioned between the expander tube and the depressed portions 18. In some constructions the rib 28 of the shim 26 may be extended entirely across the shim. However, in the construction illustrated, the length of the rib 28 is determined by the spacing between the abutment shoulders 18. The ends 30 of the shim 26 are widened to more than underlap the abutment area of the portions 18 to prevent the edges of the portions 18 from marking the outer surfaces of the tube 22.

By bridging the gap 32 between the ends of adjacent blocks 12 with the shim 26, the tube 22 is supported and the tendency for the tube to enter this gap upon inflation is avoided. The shim 26 takes care of any separation of the blocks which may occur during operation of the brakes.

Having thus described my invention, what I desire to secure by Letters Patent and claim is:

1. In an expander tube brake, a shim positionable between the expander tube and the brake blocks comprising a thin base portion and a portion projecting therefrom for engagement with the brake blocks to locate the shim relative to opposed ends of adjacent brake blocks.

2. A shim for expander tube brakes comprising a thin base portion to be positioned between the expander tube and the brake blocks, and a rib projecting from said base insertable between adjacent brake blocks.

3. An expander tube brake comprising a channel for supporting an expander tube, a tube supported in said channel, radially projected brake blocks supported in said channel and upon said tube, said brake blocks having adjacent ends slightly spaced, means inserted between said tube and said brake blocks for bridging the ends of adjacent brake blocks, and means projecting from each of said first named means into the spaces respectively between said blocks to locate said first named means relatively to the ends of said brake blocks.

4. An expander tube brake comprising a channel, an expander tube supported in said channel, brake blocks supported upon said expander tube and in said channel for radial movement, said brake blocks having adjacent ends slightly spaced, shim members positioned between said tube and adjacent ends of said brake blocks to present a continuous supporting surface for the outer surface of said tube between adjacent brake blocks, and a rib projecting from each of said shims into each space respectively between said adjacent ends for locating the shims relatively to said opposed ends.

JAMES T. KING.